United States Patent
Guilmette

[11] Patent Number: 5,804,110
[45] Date of Patent: Sep. 8, 1998

[54] CONTROL FOR SPRAYING FOAM INTO HOLLOW BODY CAVITIES

[75] Inventor: Bruce T. Guilmette, Ortonville, Mich.

[73] Assignee: Foamseal, Inc., Oxford, Mich.

[21] Appl. No.: 319,130

[22] Filed: Oct. 6, 1994

[51] Int. Cl.$^6$ ................................................. B29C 44/18
[52] U.S. Cl. ........................ 264/40.4; 264/46.6; 425/145
[58] Field of Search ........................... 425/145; 264/40.4, 264/51, 46.6

[56] References Cited

U.S. PATENT DOCUMENTS

| | | | |
|---|---|---|---|
| 3,742,901 | 7/1973 | Johnston | 118/669 |
| 4,059,227 | 11/1977 | Hunter | 239/1 |
| 4,125,138 | 11/1978 | Dever, Jr. et al. | 141/141 |
| 4,153,402 | 5/1979 | Sanderson | 425/145 |
| 4,158,535 | 6/1979 | Dever, Jr. | 425/139 |
| 4,278,046 | 7/1981 | Clarke et al. | 118/695 |
| 4,285,893 | 8/1981 | Contastin | 264/54 |
| 4,362,124 | 12/1982 | Fleig | 118/698 |
| 4,421,468 | 12/1983 | Bokelmann | 425/145 |
| 4,546,724 | 10/1985 | Kiryu et al. | 118/669 |
| 4,559,192 | 12/1985 | O'Malley | 264/51 |
| 4,571,319 | 2/1986 | Baluch et al. | 425/145 |
| 4,593,360 | 6/1986 | Cocks | 364/468 |
| 4,613,528 | 9/1986 | Mueller | 427/421 |
| 4,684,920 | 8/1987 | Reiter | 340/310.01 |
| 4,702,931 | 10/1987 | Falcoff | 427/10 |
| 4,800,050 | 1/1989 | Hahn et al. | 425/145 |
| 4,992,952 | 2/1991 | Sasaki | 364/510 |
| 5,134,961 | 8/1992 | Giles et al. | 118/684 |
| 5,280,433 | 1/1994 | Ettinger et al. | 364/468 |
| 5,466,404 | 11/1995 | Kiefer | 264/408 |

*Primary Examiner*—Allan R. Kuhns
*Attorney, Agent, or Firm*—Howard & Howard

[57] ABSTRACT

A control for dispensing foam into hollow body cavities includes an index hole positioned adjacent to a dispense hole to receive the foam. The index hole carries information that is read by a sensor associated with a foam spray gun, wherein the information is selected to correspond to the desired amount of foam for the particular body cavity. With the inventive foam spray gun and method, an operator merely inserts the dispense nozzle into a dispense hole, and the sensor reads the information from the index hole. The sensor signal then allows control of the amount of foam dispensed into the dispense hole. This eliminates problems that have been experienced in the past wherein operators were forced to remember the amount of "shots" of fixed volumes of foam for each hole. In the past, operators may sometimes have dispensed too little foam or too great an amount of foam for a particular hole. Further, in the past, operators may sometimes have dispensed foam into a hole that should not have received any foam. The foam spray gun is preferably of the type having a reciprocating plunger controlling flow of the foam components to the dispense nozzle. The plunger is controlled by a trigger, which in the prior art was actuated for each of the fixed volume "shots." With the inventive method, the use of repeated "shots" to supply a particular volume may be eliminated. Thus, the plunger may be actuated a single time for the entire volume needed for the particular body cavity. This increases the life of the foam spray gun, as lifetime is frequently limited by the number of reciprocations of the plunger.

20 Claims, 2 Drawing Sheets

CONTROL FOR SPRAYING FOAM INTO HOLLOW BODY CAVITIES

BACKGROUND OF THE INVENTION

This application in general relates to a unique method and apparatus for dispensing a foam material into a hollow body cavity.

In the prior art, it is known to dispense foam to fill hollow body cavities. As an example, vehicle bodies have a number of hollow frame members which are filled with foam. The foam is useful for many purposes including noise reduction, dust and moisture inhibition, and the control of air leakage through the hollow body members to improve air flow efficiency within the vehicle.

The use of foam to fill hollow body members has proven quite successful. However, practical realities with dispensing the foam into the hollow body cavities present some problems. First, for volume control the foam has typically been dispensed into the hollow body cavities in fixed volume "shots" which are each actuated by an operator pulling a trigger on the foam spray gun. Thus, the operators have typically needed to remember whether a particular dispense hole required one shot, two shots, three shots, etc. This has produced a requirement that the operator be specifically trained to remember how many shots must be dispensed into each of the cavities on the vehicle body. Even with operator training, problems have sometimes arisen wherein an operator has underfilled or overfilled a particular body cavity.

Also, many of the dispense holes leading into the cavities are in locations that are relatively difficult to see. An operator may also sometimes have difficulty easily reaching the dispense hole. In such cases, operators have sometimes inserted the dispense nozzle into a hole other than the proper dispense hole. In that case, a hole which is not to receive foam may actually receive foam, while the proper dispense hole receives no foam. This problem is made more pronounced by the fact that vehicle bodies include a number of holes which have no relationship at all to receiving foam.

One final problem with the prior art method occurs due to the operation of the foam spray guns. One particularly well known type of foam spray gun includes a reciprocating plunger that closes or opens communication between the supply of the two foam components and a conduit leading to the dispense nozzle. After repeated reciprocation, the plunger will sometimes seize, making it necessary to repair the gun. In fact, the lifetime of any foam spray gun is typically measured in an expected number of actuations of the trigger, and the resulting reciprocations of the plunger. The prior art use of repeated "shots" of the gun to achieve multiple volumes increases the number of reciprocations, thus decreasing the effective lifespan of the foam spray gun.

SUMMARY OF THE INVENTION

In a disclosed embodiment of this invention, an indicia is placed on the body forming the cavity, and in a position associated with a dispense hole that is to receive a desired amount of foam. The indicia includes information relative to the desired amount of foam which is to be received in the dispense hole. A sensor is provided on the foam spray gun adjacent to the dispense nozzle. The sensor reads the information from the indicia and controls a supply for the foamable material leading to the dispense nozzle. The sensor ensures that the desired amount of foam is directed to the dispense nozzle. Variation in the dispensed volume due to operator error are eliminated. Further, a single actuation can be utilized to supply any volume of foam. The repeated "shots" as were required by the prior art are eliminated. Thus, the number of reciprocations of the plunger are reduced and the effective life of the foam spray gun is increased.

In a preferred embodiment of this invention, the indicia includes a separate index hole spaced from the dispense hole. In one embodiment, the index hole is preferably formed of a diameter associated with the desired amount of foam to be received into the dispense hole. In this preferred embodiment, the sensor is preferably spaced from the dispense nozzle by a distance which approximates the distance between the centers of the index hole and the dispense hole. The sensor is preferably a magnetic flux sensor, and most preferably an eddy current type sensor. The sensor is inserted into the index hole, and senses the diameter of the hole. Fine control eddy current sensors are available which are able to distinguish small gradiations in the diameter of the index hole. The diameter of the index hole is then associated with a desired amount of foam to be dispensed into the dispense hole. The sensor communicates with a control supplying foam to the dispense nozzle and the desired amount of foam is dispensed into the dispense hole. With an eddy current type sensor, even if the sensor is positioned off center in the index hole, a misreading will not occur. Variations in the readings from the portion of the index hole closer to the off center sensor will be cancelled out by the portions of the hole which are spaced further from the sensor.

It has been found that with $\frac{1}{32}$" variation, beginning with a $\frac{1}{4}$" hole and moving to larger holes, one standard eddy current sensor can sense 1.2 volts separation between hole sizes. This is sufficient such that the sensor will be able to readily read the particular hole size gradiations, and determine the desired amount of foam for the particular dispense hole. Workers of ordinary skill in the art would recognize that the eddy current sensor could be easily calibrated to read the various hole sizes, and then identify the desired amount of foam associated with that particular hole size. It should also be understood that the thickness of the metal that receives the index hole must also be calculated into the identification process.

In a most preferred embodiment of this invention, the eddy current sensor has a sensing tip extending forwardly of an end face. The end face may be positioned against an outer face of the body which is to receive the foam. The sensor end face provides a stop member, properly positioning the foam spray gun with the dispense nozzle in the dispense hole, and the sensor tip in the index hole.

In a method according to the present invention, a foam spray gun is provided that includes the appropriate dispense nozzle and sensor, with the sensor communicating with a foam supply control. The body to receive the foam includes dispense holes for receiving the dispense nozzle, with the dispense holes each being associated with an indicia indicating the desired amount of foam to be received in the particular dispense hole. The indicia is preferably formed by a separate index hole spaced from the dispense hole by a small known distance.

The foam spray gun is positioned with the dispense nozzle received in the dispense hole, and the sensor received in the index hole. In one embodiment, the sensor reads the diameter of the index hole, and provides a signal to the control that is associated with the amount of foam desired to be dispensed in that particular dispense hole. If no signal is received from the sensor, then the control is not actuated and no foam is sent to the dispense nozzle. In that way, it is not possible for an operator to dispense foam into a hole which does not have an associated indicia or index hole. Thus, the problem of operators dispensing foam into a "wrong" hole is eliminated. Moreover, since the indicia identifies the exact amount of foam desired for the particular dispense hole, the problem of oversupply or undersupply is also eliminated.

In a method according to the present invention the sensor is actuated when the operator pulls the trigger on the foam spray gun. The trigger will also typically actuate the plunger to move the plunger to an open position allowing flow of the foam components toward the dispense nozzle. The control will preferably monitor and meter the amount of foamable material having been sent to the dispense nozzle and close flow once the desired amount has moved to the dispense nozzle. At that time, the plunger may also be automatically returned to the closed position. Thus, only one actuation of the plunger is necessary to achieve the desired volume.

The invention may be better understood from the following specification and drawings, of which the following is a brief description.

DETAILED DESCRIPTION OF THE PREFERRED EMBODIMENT

Figure 1A:
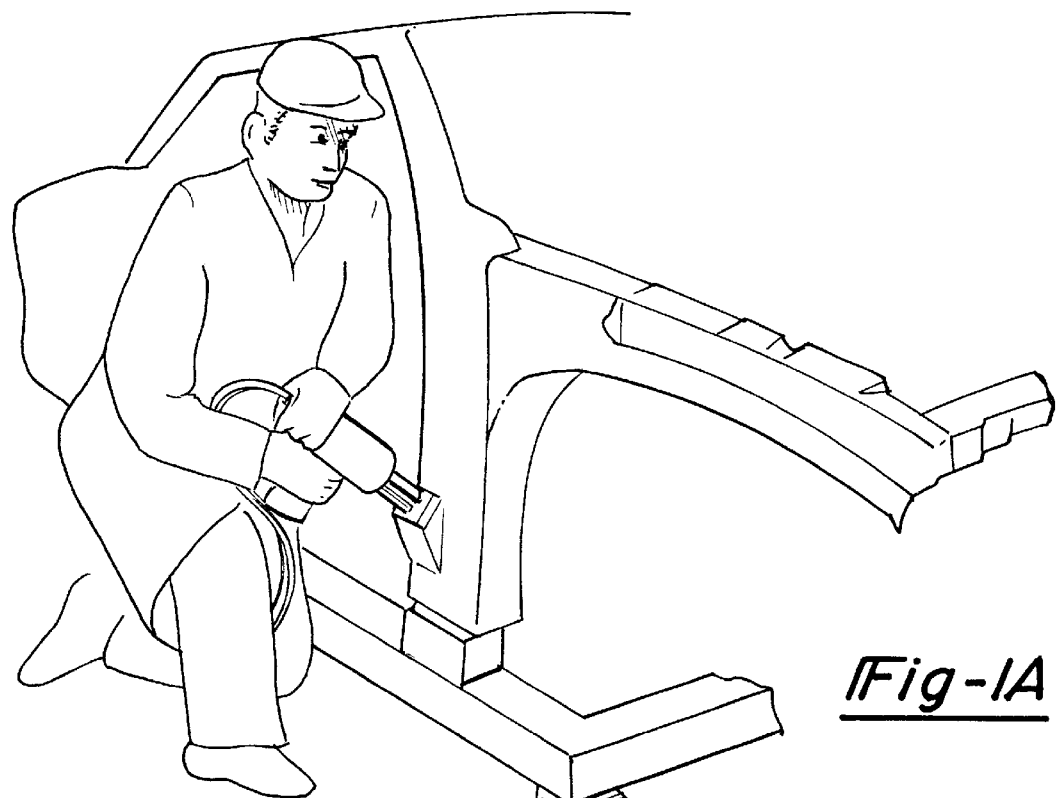
FIG. 1A shows an operator dispensing foam.
Figure 1B:
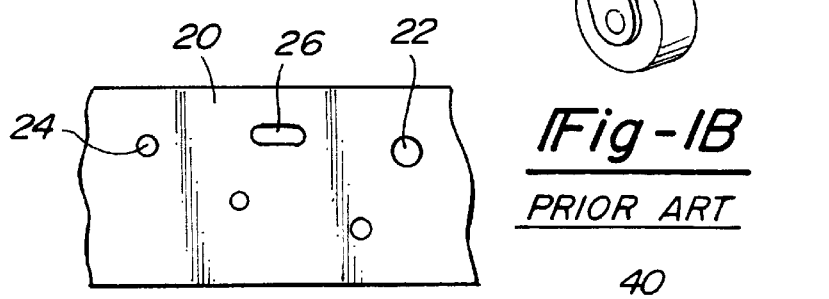
FIG. 1B is a schematic view of a body portion as would typically exist in the prior art.

FIGS. 1A and 1B show a body portion 20 as is encountered in the prior art. In the prior art, body 20 may include many holes. As an example, holes 22, 24 and 26 are shown in FIGS. 1A and 1B. It may be that hole 22 is to receive foam, and that hole 24 is also to receive foam. If the body cavities associated with holes 22 and 24 require different amount of foam, then the operator 27 of the prior art foam spray guns 29 must remember the number of "shots" of foam to be dispensed into each particular hole. This has sometimes led to oversupply or undersupply problems. In addition, body 20 may include many other holes, such as hole 26, that are not to receive foam. Operators have sometimes dispensed foam into a "wrong" hole, such as hole 26 which is not to receive foam.

Figure 2A:
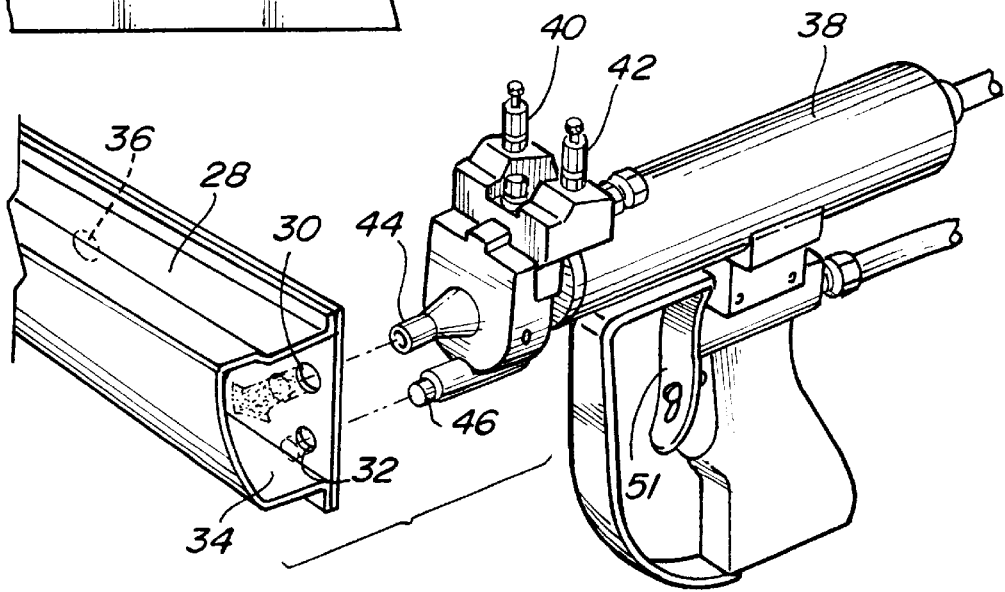
FIG. 2A is a perspective view of the inventive foam spray gun for filling body cavities.

The present invention addresses these problems by providing an indicia on the body 20 as will be explained with reference to FIG. 2A. As shown in FIG. 2A, a body 28 includes a dispense hole 30 which is to receive the foam, and which is associated with an index hole 32. Dispense hole 30 and index hole 32 both lead into a hollow body cavity 34 which is to receive foam from a foam spray gun 38. Hole 36, which is not a dispense hole and is not to receive foam, is not associated with an index hole. As will be explained, an operator will not be able to dispense foam into hole 36 with the inventive improvements.

Foam spray gun 38 is of the type receiving two foam components through supply connections 40 and 42. The associated supply lines are not shown in this figure. The two foam components from supply lines 40 and 42 mix and are dispensed outwardly of dispense nozzle 44. In addition, a sensor tip 46 is associated with foam spray gun 38 and spaced from dispense nozzle 44 by a distance which is approximately equal to the distance between dispense hole 30 and index hole 32.

Figure 2B:
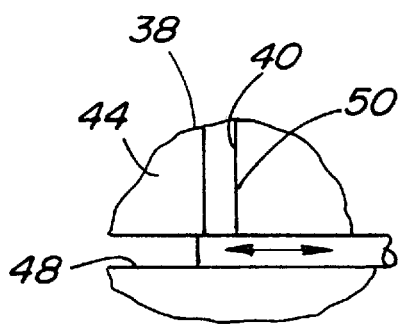
FIG. 2B is a schematic view of a portion of the foam spray gun shown in FIG. 2A.

As shown in FIG. 2B, foam spray gun 38 is of the type having a conduit 48 leading to dispense nozzle 44, with a reciprocating plunger 50 movable within conduit 48. Plunger 50 selectively closes off the ends of supply passage 40 (and 42, not shown) to block flow of the foam components to the conduit 48. A trigger 51, see FIG. 2A, controls operation of the plunger 50. In the prior art, repeated reciprocations of plunger 50 have sometimes led to seizure of the gun, such that it must be disconnected for repair.

Figure 3:
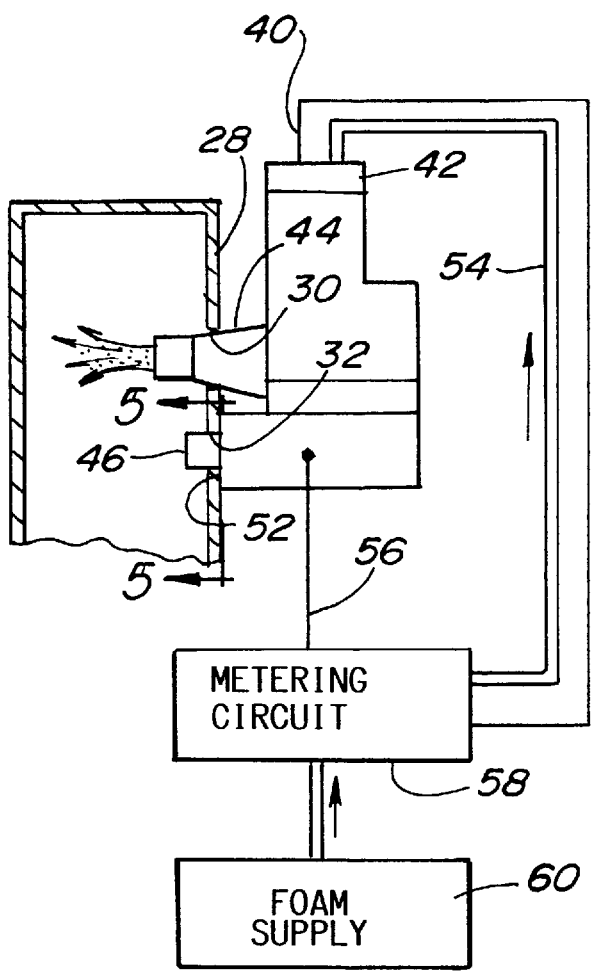
FIG. 3 is a cross-section view showing the inventive method of the present invention.

FIG. 3 shows the inventive method according to the present invention. Dispense nozzle 44 is inserted into dispense hole 30. At the same time, sensor tip 46 is inserted into index hole 32. End face 52 of the sensor 46 abuts an outer face of the body 28. This properly positions the foam spray gun 38 relative to body 28.

Foam supply lines 54 lead to supply passages 40 and 42. A signal line 56 leads from sensor 46 to a metering or control circuit 58. The signal from sensor 46 is associated with the amount of foam desired for the particular dispense hole 30 by circuit 58. Circuit 58 allows the proper amount of foam to go from foam supply 60 through supply line 54 and into passages 40 and 42. As will be explained below, the size of the index hole 32 provides an indication to sensor 46 of the amount of foam desired for the particular cavity 34 at the associated dispense hole 30. If no index signal is received, then no foam is dispensed. Thus, foam cannot be dispensed into "wrong" hole 36.

Figure 4:
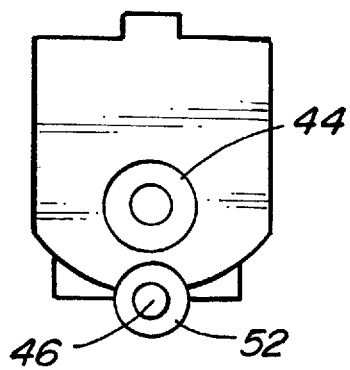
FIG. 4 is an end view of the foam spray gun according to the present invention.
Figure 5:
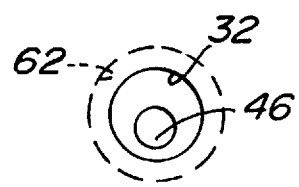
FIG. 5 is a view along line 5—5 as shown in FIG. 3.

As shown in FIG. 4, dispense nozzle 44 is spaced from sensor tip 46 by a distance which approximates the distance between dispense hole 30 and index hole 32. As shown in FIG. 5, index hole 32 receives sensor tip 46. Depending upon the amount of foam to be received in the associated dispenser hole, index hole 32 may be of a larger diameter such as shown in phantom at 62. The larger diameter would indicate to sensor 46 that a different amount of foam is desired, than if the index hole 32 had the diameter shown in solid line. The sensor 46 and metering circuit 58 reference the particular diameter to a particular desired amount of foam for the body cavity. The control circuitry required to achieve this goal is well within the skill of a worker in the art, and forms no portion of this invention.

It is preferred that sensor tip 46 be an eddy current type magnetic flux sensor. Such a sensor is not affected if off center within index hole 32, such as shown in FIG. 5. In such a case, a portion of the hole surface 32 closest to the sensor tip 46 would be compensated for by the portions further removed from sensor tip 46 in the amount of magnetic flux which is sensed. Thus, fine operator positioning of the sensor tip 46 within index hole 32 is not necessary.

In experimental evaluations, it has been found that when index holes 32 are formed with eight different size holes, each corresponding to different desired amounts of foam, there is sufficient voltage separation in the voltage sensed by the sensor 46 such that the sensor will be able to easily identify the desired amount of foam for the particular hole. In one example, the smallest hole was formed at ¼" and was moved to eight larger holes in 1/32" variations. The sensors sensed a 1.2 volt separation between each of the 1/32" diameter variations, which is easily identified by the sensor and control system. It should also be understood that the thickness of the metal of the body 28 also has some influence on the amount of voltage read by the sensor, and is factored into the initial setup of the system. A worker of ordinary skill in the art would be able to recognize the modifications necessary to accommodate various thicknesses of metal.

With the inventive method and foam spray gun, the index hole provides an indication of the desired amount of foam in increments based on different hole sizes to the sensor. Alternately, it may be desirable to provide some form of analog indicia on the body rather than the volume increments associated with varying size index holes. As an example, some form of indicia read by an electric eye associated with the foam spray gun may provide an exact analog signal of the exact desired amount of foam. Sensors other than the magnetic sensor may also be utilized within this invention. In addition, a visual indicia may be placed adjacent to the dispense hole, rather than using a separate index hole. Further, the sensor may be associated with the dispense hole, with the dispense hole itself providing the indicia. Even so, it is presently most preferred that the separate index hole and eddy current sensor be utilized.

Preferred embodiments of the present invention have been disclosed, however, a worker of ordinary skill in the art would recognize that certain modifications would come within the scope of this invention. For that reason the following claims should be studied in order to determine the true scope and content of this invention.

I claim:

1. A method of filling a hollow body cavity with foam, said method comprising the steps of:
   a. providing machine readable indicia on a body associated with a dispense hole in said body to receive a desired amount of resin foam, said body having a plurality of holes, said indicia being selected to correspond to the desired amount of foam to be dispensed from a supply of foam material into said dispense hole;
   b. placing a spray gun adjacent to said indicia, said spray gun having a sensor capable of reading said indicia and a dispense nozzle, said sensor communicating with a control for the supply of foam material to said dispense nozzle on the foam spray gun;
   c. reading said indicia with said sensor and sending a signal to said control from said sensor, said signal being dependent upon the desired amount of foam for said dispense hole as read by said sensor; and
   d. supplying foam material to said dispense nozzle from the supply of foam in an amount equivalent to the desired amount of foam.

2. A method as recited in claim 1, wherein said foam spray gun is of the type having a conduit leading to said dispense nozzle, and said foam material being supplied in two components which are mixed in said conduit, said foam spray gun further having a plunger which is reciprocated between open and closed positions, said plunger blocking communication between said component supply and said conduit in a closed position, and allowing communication between said component supply and said conduit in an open position, and the method further comprising the steps of moving said plunger to said open position as said foam is being supplied to said dispense nozzle.

3. A method as recited in claim 2, wherein said indicia is a separate index hole spaced from said dispense hole, wherein said index hole is selected to have a particular diameter associated with the desired amount of foam.

4. A method as recited in claim 3, wherein said sensor is a magnetic flux sensor which is inserted into said index hole, said magnetic flux sensor sensing the diameter of said hole, and identifying said desired amount of foam based upon said diameter of said index hole.

5. A method as recited in claim 4, wherein said sensor includes an end face that provides a stop against said body, said sensor including a sensing tip extending from said end face and into said index hole.

6. A method as recited in claim 3, wherein said sensor includes an end face that provides a stop against said body, said sensor including a sensing tip extending from said end face and into said index hole.

7. A method of filling a hollow vehicle body cavity comprising the steps of:
   a. providing a plurality of holes in a vehicle body, providing indicia on said body associated within at least one dispense hole in said body to receive a desired amount of foam, said indicia being selected to correspond to said desired amount of foam to be dispensed into said dispense hole;
   b. providing a sensor on a foam spray gun capable of reading said indicia, said sensor communicating with a control for the supply of foam material to a dispense nozzle on the foam spray gun;
   c. placing said spray gun adjacent to said indicia, and reading said indicia with said sensor;
   d. sending a signal to said control from said sensor, said signal being dependent upon the desired amount of foam for said dispense hole as read by said sensor; and
   e. supplying foam material to said dispense nozzle in an amount equivalent to said desired amount.

8. A method as recited in claim 7, wherein said foam spray gun is of the type having a conduit leading to said dispense nozzle, and said foam material being supplied in two components which are mixed in said conduit, said foam spray gun further having a plunger which is reciprocated between open and closed positions, said plunger blocking communication between said component supply and said conduit in a closed position, and allowing communication between said component supply and said conduit in an open position, and the method further comprising the steps of moving said plunger to said open position as said foam is being supplied to said dispense nozzle.

9. A method as recited in claim 8, wherein said indicia is a separate index hole spaced from said dispense hole, said index hole having characteristics that identify said desired amount of foam for said dispense hole.

10. A method as recited in claim 9, wherein said index hole is selected to have a particular diameter associated with a desired amount of foam.

11. A method as recited in claim 10, wherein said sensor is a magnetic flux sensor which is inserted into said index hole, said magnetic flux sensor sensing the diameter of said hole, and identifying said desired amount of foam based upon said diameter of said index hole.

12. A method as recited in claim 11, wherein said sensor includes an end face that provides a stop against said body, said sensor including a sensing tip extending from said end face and into said index hole.

13. A method as recited in claim 10, wherein said sensor includes an end face that provides a stop against said body, said sensor including a sensing tip extending from said end face and into said index hole.

14. A method as recited in claim 8, wherein said plunger is reciprocated to said open position once, during the dispensing of said desired amount of foam, and is returned to said closed position after said desired amount of foam has been dispensed into said dispense hole.

15. A method as recited in claim 7, wherein said indicia is a separate index hole spaced from said dispense hole, said index hole having characteristics that identify said desired amount of foam for said dispense hole.

16. A method as recited in claim 15, wherein said index hole is selected to have a particular diameter associated with a desired amount of foam.

17. A method as recited in claim 16, wherein said sensor includes an end face that provides a stop against said body, said sensor including a sensing tip extending from said end face and into said index hole.

18. A method of dispensing foam into a hollow body cavity comprising the steps of:
- a. providing a dispense hole in a body, said dispense hole communicating with a body cavity to receive a desired amount of foam in said body, and further providing an index hole spaced from said dispense hole, said index hole having a diameter selected to correspond to said desired amount of foam;
- b. providing a sensor on a foam spray gun, and adjacent to a dispense nozzle on said foam spray gun, said sensor being of a magnetic flux sensing type, said sensor being spaced from said dispense nozzle by a distance approximately equal to a distance between said index hole and said dispense hole in said body, said sensor communicating with a control for the supply of foam material to said dispense nozzle;
- c. inserting said dispense nozzle into said dispense hole, and inserting said sensor into said index hole, reading the diameter of said index hole with said sensor, sending a signal from said sensor to said control; and
- d. initiated the flow of foam material to said dispense nozzle until said desired amount of foam has been dispensed into said dispense hole.

19. A method as recited in claim 18, wherein said foam spray gun is of the type having a conduit leading to said dispense nozzle, and said foam material being supplied in two components which are mixed in said conduit, said foam spray gun further having a plunger which is reciprocated between open and closed positions, said plunger blocking communication between said component supply and said conduit in a closed position, and allowing communication between said component supply and said conduit in an open position, and the method further comprising the steps of moving said plunger to said open position as said foam is being supplied to said dispense nozzle.

20. A method as recited in claim 18, wherein said sensor includes an end face that provides a stop against said body, said sensor including a sensing tip extending from said end face and into said index hole.

* * * * *